United States Patent [19]
Lakosky

[11] Patent Number: 6,109,769
[45] Date of Patent: Aug. 29, 2000

[54] SAFETY LIGHTING DEVICE; SNOWMOBILE INCLUDING SAFETY LIGHTING DEVICE; AND METHOD FOR PROVIDING SAFETY LIGHTING ON A SNOWMOBILE

[76] Inventor: Allen J. Lakosky, 807 7th St. South, Virginia, Minn. 55792

[21] Appl. No.: 08/967,712

[22] Filed: Nov. 10, 1997

[51] Int. Cl.$^7$ .................................................. B60Q 1/00
[52] U.S. Cl. .......................... 362/459; 362/542; 362/544; 362/545
[58] Field of Search .................................. 362/184, 459, 362/542, 543, 544, 545, 546

[56] References Cited

U.S. PATENT DOCUMENTS

| | | | |
|---|---|---|---|
| 5,149,190 | 9/1992 | MacKenzie | 362/234 |
| 5,565,839 | 10/1996 | Poss | 340/331 |
| 5,598,065 | 1/1997 | Lakosky | 315/77 |

OTHER PUBLICATIONS

"HT–201XX Series One Lamp/LED Flash Driver," Holtek Microelectronics Inc., Feb. 17, 1994, pp. 1–5.

Primary Examiner—Sandra O'Shea
Assistant Examiner—John Anthony Ward
Attorney, Agent, or Firm—Merchant & Gould P.C.

[57] ABSTRACT

The invention relates to a safety lighting device for use on a snowmobile. The safety lighting device includes a light emitting diode for providing illumination, an energy source for providing a current, a switch for controlling electrical connectivity between the light emitting diode and the energy source, and an energy source mounting assembly for holding the energy source on a snowmobile. The light emitting diode preferably provides a luminous intensity of at least about 1,000 mcd at 25° C. and a forward current of 20 mA. The energy source preferably provides a current of between about 1 and about 5 volts. The energy source mounting assembly preferably includes a first surface constructed and arranged for mounting to a snowmobile, and a second surface constructed and arranged for holding the energy source. Preferably, the energy source is either an alkaline battery source or a lithium battery source. It is expected that two size AA lithium batteries will meet the requirements of the present invention.

24 Claims, 3 Drawing Sheets

SAFETY LIGHTING DEVICE; SNOWMOBILE INCLUDING SAFETY LIGHTING DEVICE; AND METHOD FOR PROVIDING SAFETY LIGHTING ON A SNOWMOBILE

FIELD OF THE INVENTION

This invention relates to a safety lighting device for snowmobiles; to a snowmobile having a safety lighting device; and to a method for providing safety lighting on a snowmobile.

BACKGROUND OF THE INVENTION

The sport of snowmobiling has become increasingly popular over the past several decades. It is believed that this increase in popularity can be attributed, at least in part, to advances made in snowmobile design technology. As a result of this increase in popularity, snowmobile traffic on trails in New England states, Mountain States and the Upper Midwest has increased. It is expected that the popularity of snowmobiling will continue to grow, and that congestion on snowmobile trails will increase.

It is believed that the growth in snowmobile traffic has resulted in an increased number of snowmobile related accidents. Many of these accidents occur at night. Generally, snowmobiles provide lighting in the form of headlights and taillights. These lights have at least two purposes. They allow the snowmobile operator to see the terrain, and they increase the visibility of the snowmobile to others. The headlights and taillights of snowmobiles presently on the market do not remain on when the snowmobiles are turned off. As a result, snowmobiles which are turned off may pose a hazard at night if they are not sufficiently visible to other snowmobile operators. Snowmobile operators have many reasons to turn off their engines, which in turn results in turning off the headlights and taillights. While snowmobiles have become increasingly reliable, mechanical failure often occurs and requires turning off the engine. In addition, snowmobile operators often stop their vehicles for various other reasons including resting checking fluid levels, changing gloves, reading a map, and the like. In general, snowmobile operators do not want to leave their snowmobiles running when they stop for prolonged periods of time. The reason is that the cooling systems of most snowmobiles are designed to have snow constantly thrown onto their heat exchangers by means of forward propulsion. Prolonged idling can cause the engine to overheat and ultimately become damaged.

Snowmobile operators sometimes carry flashlights with them at night. When they leave their snowmobile on the side of a trail or on a lake without any illumination, it poses a hazard to other snowmobile operators in the vicinity. If they leave a flashlight with the snowmobile to illuminate it, the flashlight tends to project light in essentially one direction and may not provide sufficient warning for other snowmobile operators in the vicinity. Furthermore, the cold temperature has an adverse effect on the batteries causing a decrease in voltage and a dimming of the light.

Snowmobiles have become much faster over the years. As a result, snowmobiles often travel at high speeds, even at night. It is believe that many snowmobile operators travel at speeds which are unsafe considering the illumination provided by their headlights. Even if the snowmobile operators are not traveling at high speeds, the snow conditions may be too slippery or icy to permit rapid braking once an object comes within view of the snowmobile operators' headlights.

Many groomed snowmobile trails have sharp corners and turns which decreases the visibility of potential hazards in the trails such as stopped snowmobiles. When the hazard is another snowmobile which is not illuminated, severe injury can result if the snowmobiles collide. With the increase in snowmobile deaths in recent years, a need exists for providing better illumination for snowmobiles which have been turned off.

SUMMARY OF THE INVENTION

The invention relates to a safety lighting device for use on a snowmobile. The safety lighting device includes a light emitting diode for providing illumination, an energy source for providing a current, a switch for controlling electrical connectivity between the light emitting diode and the energy source, and an energy source mounting assembly for holding the energy source on a snowmobile. The light emitting diode preferably provides a luminous intensity of at least about 1,000 mcd at 25° C. and a forward current of 20 mA. The energy source preferably provides a current of between about 1 and about 5 volts. The energy source mounting assembly preferably includes a first surface constructed and arranged for mounting to a snowmobile, and a second surface constructed and arranged for holding the energy source. Preferably, the energy source is either an alkaline battery source or a lithium battery source. It is expected that two size AA lithium batteries will provide sufficient illumination and longevity for the present invention.

The light emitting diode is preferably an ultra bright LED. This means that it preferably provides a luminous intensity of greater than about 5,000 mcd at 25° C. in a forward current of 20 mA. In addition, the light given off by the LED is primarily focused light. This means that a majority of the light given off by the LED is primarily projected in a focused field of view. Preferably, the focused field for purposes of the present invention is less than about 90 degrees at 25 feet from the LED.

The invention relates to a snowmobile including a safety lighting device. The snowmobile includes an engine, a cowl covering the engine, a dashboard, a headlight, and a taillight. The headlight includes a light emitting diode therein for providing illumination when the snowmobile is turned off. An energy source is provided for energizing the light emitting diode, and the energy source is provided proximate to the engine to receive warming heat therefrom. A switch is provided for controlling electrical connectivity between the energy source and the light emitting diode. Preferably, both the headlight and the taillight include a light emitting diode therein for providing illumination when the snowmobile engine is turned off. In addition, the energy source is desirably provided underneath the cowl in order to protect the energy source from the wind, snow, and cold temperatures. It is expected that the temperature underneath the cowl, proximate the engine, will be warmer than the ambient temperature around the snowmobile under usual conditions of operation.

The invention relates to a method for providing safety lighting on a snowmobile. According to the present invention, safety lighting refers to lighting provided when the engine of a snowmobile, or other transportation apparatus, has been turned off. The method includes steps of providing a snowmobile having an engine, a cowl covering the engine, a dashboard, a headlight, and a taillight; providing a low voltage light within the taillight; and providing an energy source for illuminating low voltage light. Preferably, the low voltage light is a light emitting diode having ultra bright characteristics.

DETAILED DESCRIPTION OF THE INVENTION

Figure 1:
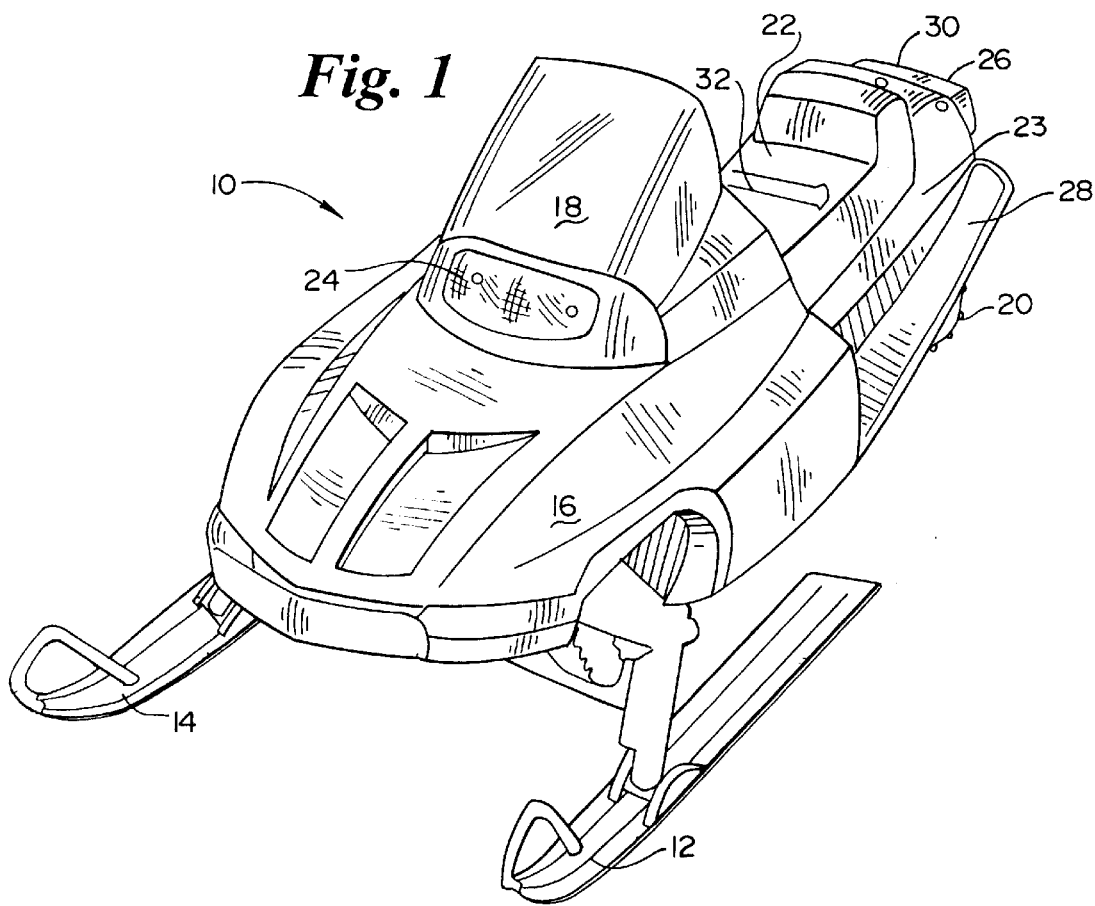
FIG. 1 is a perspective view of a snowmobile including a safety lighting device according to the principles of the present invention provided in the headlight and taillight.

Now referring to FIG. 1, a snowmobile is depicted at reference numeral 10. The snowmobile is representative of several commercially available snowmobiles generally. It includes a pair of front skis 12 and 14, a hood cowl 16, a windscreen 18, a drive track 20, and associated drive track suspension (not shown), an occupant seat 22, a chassis 23, running boards 28, a headlight 24, and a taillight 26. The cowl 16 covers an internal combustion engine, although any suitable power source may be used. To the rear of the cowl 16, the occupant seat 22 is mounted on the chassis 23. The running boards 28 are provided on each side of the chassis 23 for receiving the feet of the rider or riders. At the rear end of the seat 22, there is a luggage or cargo compartment 30. A handlebar-type steering throttle and/or brake assembly 32 is provided to control the snowmobile 10.

Figure 2:
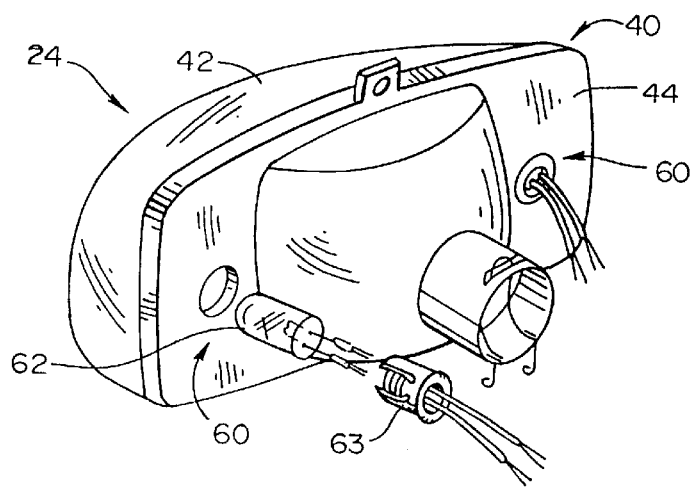
FIG. 2 is a partially exploded, perspective view of the backside of the headlight shown in FIG. 1.
Figure 3:
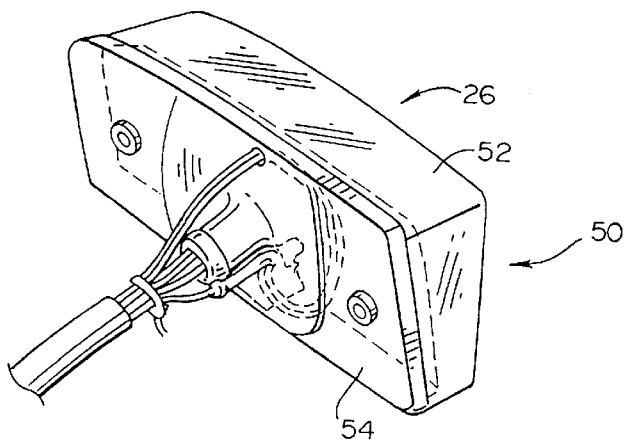
FIG. 3 is a perspective view of the backside of the taillight of the snowmobile of FIG. 1.
Figure 4:
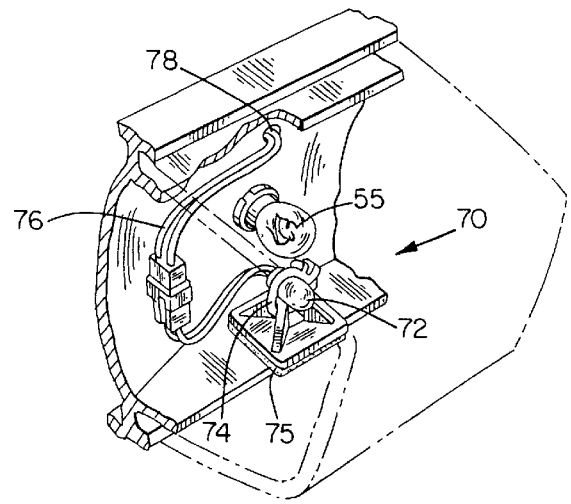
FIG. 4 is a sectional view of the taillight of FIG. 3.

The headlight 24 and the taillight 26 are shown in more detail in FIGS. 2–4. In a preferred embodiment, the headlight and taillight are modified versions of conventional headlight and taillight components, or stock lighting, found on commercially available snowmobiles. The conventional headlight and taillight components can be modified to incorporate the safety lighting device of the invention. Thus, the invention additionally relates to kit for providing such a modification to stock lighting. Alternatively, headlights and taillights can be designed and manufactured to incorporate the safety lighting device.

As shown in FIGS. 2–4, the headlight 24 and the taillight 26 are self-contained structures. That is, the headlight and taillight are units which can be inserted into a snowmobile. The headlight 24 is a self-contained structure 40 including a lens 42, a frame or backing 44, and a bulb surrounded by a reflector for projecting or reflecting light forward. The frame 44 attaches to the snowmobile and the structure 40 encloses a standard halogen bulb.

The trend for lenses on snowmobile headlights is to provide them with a low degree of diffusion. The reason for this is to enhance the lighting area provided by the headlight. Accordingly, it is desirable to provide a halogen bulb in a headlight configuration which projects as much brightness forward as possible. In order to accomplish this, the interior of the frame 44 is provided as a rounded dome of reflective material so more light is cast forward.

The taillight 26 similarly includes a self-contained structure 50 provided with a lens 52 and a frame 54. The structure 50 includes a conventional bulb 55 commonly used in the automotive industry for providing lighting. The purpose of the rear light is generally to increase the visibility of the snowmobile to others, and to provide notice of braking. As a result, the lens 52 is typically very diffused. The structure 50 includes a reflector to direct light outward.

The safety lighting device of the present invention is provided at reference numeral 60 attached to the headlight unit 40. The safety lighting device shown includes a low voltage light 62 which is held within the headlight unit 40 by a collar 63. The collar 63 provides an interference fit between the low voltage light 60 and the frame 44 and is a preferred style of collar. It should be appreciated that various styles of collars can be used without departing from the invention. Exemplary collars commonly used for holding light emitting diodes in place are available from Radio Shack, and include threaded and snap-in collars which may be injection molded. In addition, it is expected that adhesive will sufficiently hold the low voltage lights in place.

An alternative embodiment of the safety lighting device of the invention is provided at reference numeral 70 and is shown in FIGS. 3 and 4. The safety lighting device 70 includes a low voltage light 72 which is held in place within the taillight 50 by a clamp 74 which is attached to the interior of the taillight 50 by adhesive 75. The low voltage light 72 is connected to an electrical power source by lines 76 which pass through the frame 54 and aperture 78.

As discussed above, the interior of the frame of conventional snowmobile headlights are provided with a rounded dome shape having a reflective coating in order to cast or direct light forward. When the low voltage light is provided inside such a headlight, it is generally desirable to take advantage of the rounded dome shape of the interior frame of the headlight so that as much illumination as possible is projected from the low voltage light outside of the headlight. In order to maximize the use of the reflectivity inside a headlight, it is generally preferable that the low voltage light is provided as close as possible to the halogen bulb, but not too close to interfere with the function of the halogen bulb. The low voltage light should be far enough from the halogen bulb so that the low voltage light does not melt because of the heat generated by the halogen bulb. It is expected that the low voltage light will be positioned between about ⅛ inch and 3 inches from the halogen bulb, preferably between about ¼ inch and about 1½ inches from the bulb, and more preferably between about ½ inch and 1 inch from the bulb. In the case of a structure not having a rounded dome of reflective material, it less important for the low voltage light to be as close to the bulb.

Figure 6:
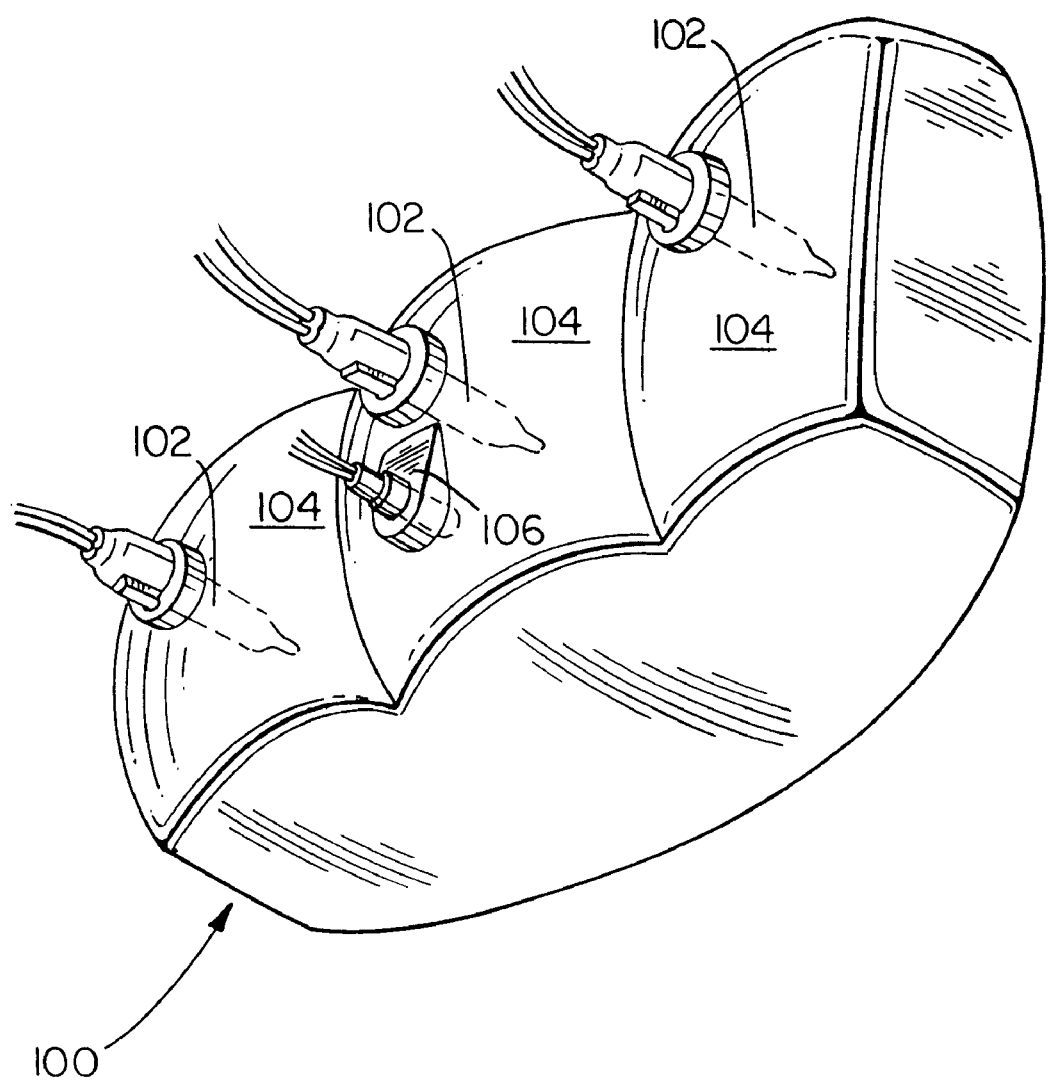
FIG. 6 is a perspective view of a snowmobile headlight including a safety lighting device according to the principles of the present invention.

While the safety lighting device of the present invention can be used for retrofitting existing snowmobile headlight and taillight housings, it is expected that manufacturers of headlights and taillights will design their molds in order to accommodate the incorporation of the safety lighting device. FIG. 6 shows a headlight 100 having three bulbs 102 and three domed regions 104 of reflective material provided for projecting reflected light forward. It is expected that a single low voltage light will provide sufficient illumination, particularly if it is arranged to take advantage of a reflective domed region. In general, it is preferable that the low voltage light is arranged in the same direction as the bulb so as to take advantaged of the reflective domed region and thereby direct light at an angle corresponding to that created by the bulb. One way to accomplish this is to provide a platform 106 for mounting the low voltage light. The platform 106 includes an opening 108 for insertion of the low voltage light. It is expected that manufacturers of headlights and taillights will adjust the frames so that the low voltage light directs light at the correct angle and distance from the light bulbs. Furthermore, it is expected that the manufacturers of headlights and taillights will use adhesive to hold the low voltage light in place.

The low voltage light is preferably a light emitting diode (LED). Exemplary LEDs which can be used in the lighting device of the present invention are available from Purdy Electronics Corporation. A preferred type of LED is a high brightness LED such as an InGaAlP(Indium-gallium-aluminum-phosphate) LED lamp. Exemplary types are sold under the name "AND190HYT" and "AND190HRP" by Purdy Electronics Corporation. In general, it is expected that the preferred low voltage light of the present invention will run off a voltage of between about 1 volt and about 5 volts, and preferably between about 1.8 volts and 3.0 volts, and more preferably between about 2.0 volts and about 2.8 volts. In general, brightness is sacrificed if the voltage falls below about 1.8. Furthermore, it is expected that the low voltage light will have a life span within those voltage ranges of at least 10,000 hours, and preferably at least about 100,000 hours.

Preferred LEDs are those which emit focused light. This means that the majority of light given off by the LED is primarily projected in a focused field of view. Preferably, the focused field of view is within about 90 degrees at 25 feet from the light source, more preferably within about 50 degrees at 25 feet from the light source, and even more preferably within about 20 degrees at 25 feet from the light source. If the light is too focused, it may not spread sufficiently to allow desired visibility. If the light is not focused enough, it is expected that it will not be bright enough to provide sufficient visibility at increased distances.

The low voltage light can be provided with different colors. This may be advantageous when differentiating in color between the low voltage light used in the headlight and the low voltage light used in the taillight. For example, it may be desirable to use a low voltage light which gives off a yellow light in the headlight, and a low voltage light which gives off a red light in the taillight. It is expected that the brightness of various colors may differ. However, it is expected that the low voltage light should provide a luminous intensity of at least about 1,000 mcd at 25° C. and a forward current of 20 mA. Preferably, the luminous intensity at those conditions is greater than about 5,000 mcd, and more preferably greater than about 10,000 mcd. In a most preferred embodiment, the luminous intensity will be about 15,000 mcd or greater. In the case of ultra bright LEDs, it is expected that the luminous intensity will not be greater than about 20,000 mcd at 25° C. and a forward current of 20 mA, although higher luminous intensity would be desirable.

It has been observed that the low voltage light 62 can be viewed at great distances. It is expected that the light can be clearly distinguished at a distance which allows another snowmobile to safely slow down to avoid a collision. It is expected that this should include a distance of greater than about 300 yards on a clear winter night. The diffused nature of the lens of the headlight and/or taillight causes the field of view to increase. Furthermore, an advantage of using LEDs as the low voltage light is that it is expected that they can handle the vibrations encountered when snowmobiling. In general, it is expected that other lights having filaments are likely to break during operation on a snowmobile.

It is preferred that the low voltage light 62 is one which can be operated using a light weight power source. An exemplary light weight power source is a commercially available battery such as an alkaline or a lithium battery. Preferably, the power source includes two 1.5 volt AA batteries connected in series. Advantageously, the power source can be provided proximate the engine and under the cowl 16. Providing the energy source under the cowl 16 helps protect the battery from the elements including the cold temperatures and the snow. Furthermore, providing the batteries proximate the engine provides heating of the batteries during operation of the snowmobile. The cowl 16 further helps to retain the heat generated by the engine when the snowmobile is turned off. It should be appreciated that the power source is preferably provided at a location which allows replacement of the batteries fairly conveniently. By placing the power source under the cowl 16, one can simply pull the cowl back to expose the engine, and then replace the batteries as needed. It is expected that when two AA alkaline batteries are used as the power source, they can provide illumination for at least approximately 10 to 20 hours based on 4 LEDs and considerably longer with lithium batteries. It is expected that two 1.5 volt lithium batteries will provide illumination of two LEDs (one in the headlight and one in the taillight) for at least about 60 hours.

A switch 67 is preferably provided on the dashboard of the snowmobile to provide convenience for use by the snowmobile operator. It should be appreciated that the switch can be provided at any location which is convenient for use by the snowmobile operator.

Figure 5:
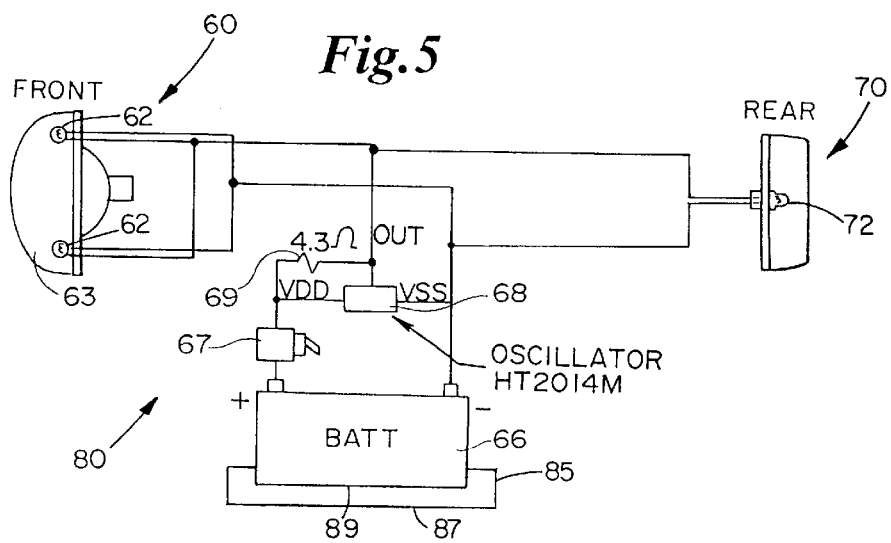
FIG. 5 is a circuit diagram showing the safety lighting device of the present invention.

Now referring to FIG. 5, a preferred circuit 80 for operating the safety lighting device 60 and 70 is shown schematically. As shown, the light emitting diodes 62 and 72 are electrically connected to the power source 66 via switch 67 and oscillator 68. The power source 66 is held in place by a mounting assembly 85 having a first surface 87 for mounting to a snowmobile, and a second surface 89 for holding the power source. The mounting assembly can be mounted to the snowmobile by adhesive, double sides adhesive tape, hook and loop fastener, or bolt and screw type fasteners.

The circuit allows the LEDs 62 and 72 to flash in unison. It should be understood, however, that the circuit can be provided so that the LEDs do not flash in unison. According to the circuit 80, the power source 66 biases the oscillator 68, the output of which drives the LEDs 62 and 72 and causes them to flash. The switch is interposed between the power source 66 and the oscillator 68 and acts as a power switch for the entire circuit. A resistor 69 is provided for limiting current to the light emitting diodes 62 and 72. In cases where the circuit is not polarity protected, a diode can be placed across two legs of the oscillator to protect the oscillator from harm by reverse polarity.

It is generally preferred for the light to flash at a rate of between 2 pulses per second and 1 pulse per 2 second, and more preferably at a rate of about 1 pulse per second. The applicant has found such a pulse rate to be more eye catching under dark conditions. Furthermore, it is desirable to provide the pulse to include an off time of between about ¼ second to about ½ second. It should be appreciated that it is generally preferred for the on time to be between about 2 to about 6 times as long as the off time.

In a preferred embodiment of the invention, the power source is two AA batteries connected in series. The oscillator is an HT-2014L oscillator commercially available from Holtek Microelectronics, Inc. The oscillator has three terminals identified as: VSS, VDD, and OUT. The positive end of the power source is electrically connected, through the switch, to the terminal identified as VDD. The negative side of the power supply is directly coupled to VSS. The resistor is preferably a 10 Ω and ¼ watt resistor connected between VDD and OUT. Preferably, the resistor is up to about 40 Ω, and is more preferably between about 4 and about 20 Ω to provide desired pulse effect. One or more LEDs are connected between OUT and VSS, oriented with their n-regions toward VSS. During operation, the voltage at OUT($V_{OUT}$) oscillates between the voltage at VDD ($V_{VDD}$) and the voltage at VSS($V_{VSS}$). During the period when $V_{OUT}=V_{VDD}$ the diode is illuminated; when $V_{OUT}=V_{VSS}$ the diode is dark.

Having described the invention in detail, and by reference to the preferred embodiments thereof, it will be apparent that modifications and variations are possible without departing from the scope of the invention as defined in the appended claims.

I claim:

1. A snowmobile including a safety lighting device comprising:
   (a) a snowmobile having an engine, a cowl covering said engine, a dashboard, a headlight, and a taillight;
   (b) light emitting diode provided within the headlight of said snowmobile, wherein said light emitting diode is a diode which provides a majority of light within an angle of less than about 90° at 25 feet;
   (c) an energy source for energizing the light emitting diode, wherein the energy source is provided proximate to the engine to receive warming heat therefrom; and
   (d) switch for providing electrical connectivity between the energy source and the light emitting diode.

2. A snowmobile including a safety lighting device according to claim 1, further comprising a light emitting diode within the taillight of said snowmobile.

3. A snowmobile including a safety lighting device according to claim 1, wherein the energy source is provided underneath the cowl and proximate the engine.

4. A snowmobile including a safety lighting device according to claim 1, wherein the switch is provided on the snowmobile dashboard.

5. A snowmobile including a safety lighting device according to claim 1, wherein the power source includes an alkaline battery or a lithium battery.

6. A snowmobile including a safety lighting device according to claim 1, wherein the light emitting diodes provides focused light.

7. A snowmobile including a safety lighting device according to claim 1, wherein the light emitting diode provides a luminous intensity of at least about 1,000 mcd at 25° C. and a forward current of 20 mA.

8. A snowmobile including a safety lighting device comprising:
   (a) a snowmobile having an engine, a cowl covering said engine, a dashboard, a headlight, and a taillight;
   (b) light emitting diode provided within the headlight of said snowmobile;
   (c) an energy source for energizing the light emitting diode, wherein the energy source is provided proximate to the engine to receive warming heat therefrom;
   (d) switch for providing electrical connectivity between the energy source and the light emitting diode; and
   (e) a collar for holding said light emitting diode to the snowmobile.

9. A snowmobile including a safety lighting device according to claim 8, further comprising a light emitting diode within the taillight of said snowmobile.

10. A snowmobile including a safety lighting device according to claim 8, wherein the energy source is provided underneath the cowl and proximate the engine.

11. A snowmobile including a safety lighting device according to claim 8, wherein the switch is provided on the snowmobile dashboard.

12. A snowmobile including a safety lighting device according to claim 8, wherein the power source includes an alkaline battery or a lithium battery.

13. A snowmobile including a safety lighting device according to claim 8, wherein the light emitting diodes provides focused light.

14. A snowmobile including a safety lighting device according to claim 8, wherein the light emitting diode provides a luminous intensity of at least about 1,000 mcd at 25° C. and a forward current of 20 mA.

15. A method for providing safety lighting on a snowmobile, said method comprising steps of:
   (a) providing a snowmobile having an engine, a cowl covering the engine, a dashboard, a headlight, and a taillight;
   (b) providing a light emitting diode which provides a majority of light within in an angle of less than 90° at 25 feet within the taillight; and
   (c) providing an energy source for illuminating the light emitting diode.

16. A method for providing safety lighting on a snowmobile including according to claim 15, wherein the energy source is provided underneath the cowl and proximate the engine.

17. A method for providing safety lighting on a snowmobile according to claim 15, further comprising providing a switch for controlling illumination of the low voltage energy source.

18. A method for providing safety lighting on a snowmobile according to claim 15, wherein the power source includes an alkaline battery or a lithium battery.

19. A method for providing safety lighting on a snowmobile according to claim 15, wherein the low voltage light provides a luminous intensity of at least about 1,000 mcd at 25° C. and a forward current of 20 mA.

20. A method for providing safety lighting on a snowmobile, said method comprising the steps of:
   (a) providing a snowmobile having an engine, a cowl covering the engine, a dashboard, a headlight, and a taillight;
   (b) providing a collar and a light emitting diode, and mounting the light emitting diode within the taillight via the collar; and
   (c) providing an energy source for illuminating the light emitting diode.

21. A method for providing safety lighting on a snowmobile including according to claim 20, wherein the energy source is provided underneath the cowl and proximate the engine.

22. A method for providing safety lighting on a snowmobile according to claim 20, further comprising providing a switch for controlling illumination of the low voltage energy source.

23. A method for providing safety lighting on a snowmobile according to claim 20, wherein the power source includes an alkaline battery or a lithium battery.

24. A method for providing safety lighting on a snowmobile according to claim 20, wherein the low voltage light provides a luminous intensity of at least about 1,000 mcd at 25° C. and a forward current of 20 mA.

* * * * *